United States Patent
Okada

(10) Patent No.: US 8,805,185 B2
(45) Date of Patent: Aug. 12, 2014

(54) WAVELENGTH-DIVISION MULTIPLEXING TRANSMISSION DEVICE

(75) Inventor: Hajime Okada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 165 days.

(21) Appl. No.: 13/583,958

(22) PCT Filed: Jun. 20, 2011

(86) PCT No.: PCT/JP2011/003499
§ 371 (c)(1),
(2), (4) Date: Sep. 11, 2012

(87) PCT Pub. No.: WO2011/161929
PCT Pub. Date: Dec. 29, 2011

(65) Prior Publication Data
US 2013/0004166 A1    Jan. 3, 2013

(30) Foreign Application Priority Data

Jun. 24, 2010  (JP) ................................. 2010-143915

(51) Int. Cl.
*H04B 17/00*  (2006.01)
*H04B 14/02*  (2006.01)
*H04J 14/02*  (2006.01)

(52) U.S. Cl.
CPC ......... *H04J 14/0221* (2013.01); *H04J 14/0206* (2013.01); *H04J 14/0201* (2013.01)
USPC .................... 398/34; 398/32; 398/33; 398/91

(58) Field of Classification Search
USPC ............. 398/30–34, 25, 83, 91–93, 158, 162, 398/195
See application file for complete search history.

(56) References Cited

U.S. PATENT DOCUMENTS

| | | | |
|---|---|---|---|
| 5,764,404 A | 6/1998 | Yamane et al. | |
| 6,064,514 A | 5/2000 | Aoki et al. | |
| 6,072,601 A | 6/2000 | Toyohara | |
| 6,324,318 B1 * | 11/2001 | Suzuki | ............................ 385/24 |

(Continued)

FOREIGN PATENT DOCUMENTS

| | | |
|---|---|---|
| JP | 9 321373 | 12/1997 |
| JP | 10 229386 | 8/1998 |

(Continued)

OTHER PUBLICATIONS

International Search Report Issued Aug. 30, 2011 in PCT/JP11/03499 Filed Jun. 20, 2011.

*Primary Examiner* — Dalzid Singh
(74) *Attorney, Agent, or Firm* — Oblon, Spivak, McClelland, Maier & Neustadt, L.L.P.

(57) ABSTRACT

A wavelength-division multiplexing transmission device including: a dummy light source configured to emit and quench dummy light; a monitoring unit configured to monitor an optical level relating to the received wavelength-division multiplexed light; a dummy light controller configured to control the dummy light source to emit dummy light in case where the monitoring unit determines based on the monitored optical level that the wavelength-division multiplexed light is in a condition of input interruption; and a multiplexer configured to multiplex the light of the wavelength modulated based on the transmission data and the dummy light emitted by the dummy light source, wherein the transmitter transmits wavelength-division multiplexed light generated by the multiplexer.

4 Claims, 16 Drawing Sheets

(56) References Cited

U.S. PATENT DOCUMENTS

| | | | |
|---|---|---|---|
| 6,449,070 B1 * | 9/2002 | Izumi | 398/79 |
| 6,714,740 B2 * | 3/2004 | Tajima | 398/31 |
| 2003/0002139 A1 | 1/2003 | Kinoshita et al. | |
| 2004/0057732 A1 | 3/2004 | Usui et al. | |
| 2006/0018658 A1 * | 1/2006 | Mori | 398/79 |

FOREIGN PATENT DOCUMENTS

| | | |
|---|---|---|
| JP | 3379052 | 2/2003 |
| JP | 2005 347941 | 12/2005 |
| JP | 2006 066946 | 3/2006 |
| JP | 4005646 | 11/2007 |
| JP | 4084144 | 4/2008 |

* cited by examiner

WAVELENGTH-DIVISION MULTIPLEXING TRANSMISSION DEVICE

TECHNICAL FIELD

This invention relates to wavelength-division multiplexing transmission devices, having a pass-through function, which is capable of stabilizing output light in case where input of wavelength-division multiplexed light is interrupted.

BACKGROUND ART

Wavelength-division multiplexing transmission devices are configured, at receivers thereof, to split wavelength-division multiplexed light per wavelength which is input to the device, and to demodulate each of the split light of the wavelengths into original signals. Those devices are also configured, at transmitters thereof, to modulate a plurality of signals into light of different wavelengths and to perform wavelength-division multiplexing on the light of the wavelengths for transmission.

Some of those wavelength-division multiplexing transmission devices are equipped with a pass-through function. The pass-through function is implemented in a certain station to transfer wavelength-division multiplexed light input by a transmission path toward a next station, where the light to be transferred does not terminate at the certain station.

Description is given specifically of an operation of the wavelength-division multiplexing transmission device having the pass-through function. In a receiver side of the device, an optical amplifier optically amplifies wavelength-division multiplexed light input from a transmission channel-a, and outputs it to a 1:2 brancher. The optical amplifier fulfills a function of supplementing a transmission loss. The 1:2 brancher demultiplexes the wavelength-division multiplexed light into two parts of light. While one of the two parts of light is output to a wavelength separator, another one of the two parts of light is output (i.e. passed through) to a wavelength filter of a transmitter 2. The wavelength separator separates the wavelength-division multiplexed light from the 1:2 brancher into light of wavelengths per wavelength, and outputs them to a wavelength converter. The wavelength converter demodulates each of the separated light to generate original signals, and outputs those signals to a signal receiver as reception data.

In a transmitter side of the wavelength-division multiplexing transmission device, a wavelength converter modulates transmission data input from a signal transmitter per signal to generate light of wavelengths, and outputs them to a wavelength-division multiplexer. The wavelength-division multiplexer performs wavelength-division multiplexing on the light of the wavelengths from the wavelength converter, and output the multiplexed light to a 2:1 multiplexer.

Meanwhile, the wavelength filter receives the wavelength-division multiplexed light which has been passed through by the receiver. The wavelength filter blocks a part of the wavelength-division multiplexed light that should be terminated at the device, whereas passes other part of the light through to the 2:1 multiplexer.

The 2:1 multiplexer multiplexes the wavelength-division multiplexed light from the wavelength-division multiplexer and the wavelength-division multiplexed light from the wavelength filter, and outputs the multiplexed light to an optical amplifier. The optical amplifier amplifies the wavelength-division multiplexed light, and transmits the amplified light toward a wavelength-division multiplexing transmission device of a next station through a transmission line-b.

By the way, the transmitter is required to stabilize output level of the optical amplifier in order to prevent a receiver of the next station from deterioration of signals. However, in case where a trouble occurs in the above-mentioned transmission line-a of the wavelength-division multiplexing transmission device having the pass-through function, the output level of the optical amplifier may not be stabilized.

More specifically, if an input of wavelength-division multiplexed light to the receiver is interrupted due to the trouble in the transmission line-a, light of a wavelength based on transmission data is generated in the wavelength converter of the transmitter, whereas wavelength-division multiplexed light to be passed through does not exist. In this situation, the output level of the optical amplifier may vary from a normal value, and then a quality of transmission line may deteriorate.

In view of the foregoing circumstances, some attempts have been made in such a way that a configuration is provided to stabilize output of the optical amplifier by controlling the amplification rate of the optical amplifier in accordance with the number of wavelengths to be input to the optical amplifier and the output of the optical amplifier at the time (See Patent Literatures 1 to 3 in a citation list).

CITATION LIST

Patent Literature

Patent Literature 1: Japanese Patent No. 4005646
Patent Literature 2: Japanese Patent No. 3379052
Patent Literature 3: Japanese Patent No. 4084144

SUMMARY OF THE INVENTION

However, in the wavelength-division multiplexing transmission devices disclosed in Patent Literatures 1 to 3, if assuming that an amplification rate of the optical amplifier is increased when a plurality of wavelengths to be passed through is interrupted simultaneously, noise components is amplified as well as signal light is.

This invention was made in view of the above circumstances and provides for a wavelength-division multiplexing transmission device which is capable of stabilize output of an optical amplifier of a transmitter without causing amplification of noise components even in case where a trouble occurs in a transmission line.

A wavelength-division multiplexing transmission device according to the present invention, includes: a dummy light source configured to emit and quench dummy light; a monitoring unit configured to monitor an optical level relating to the received wavelength-division multiplexed light; a dummy light controller configured to control the dummy light source to emit dummy light in case where the monitoring unit determines based on the monitored optical level that the wavelength-division multiplexed light is in a condition of input interruption; and a multiplexer configured to multiplex the light of the wavelength modulated based on the transmission data and the dummy light emitted by the dummy light source, wherein the transmitter transmits wavelength-division multiplexed light generated by the multiplexer.

According to the invention, the wavelength-division multiplexing transmission device includes: a dummy light source configured to emit and quench dummy light; a monitoring unit configured to monitor an optical level relating to the received wavelength-division multiplexed light; a dummy light controller configured to control the dummy light source to emit dummy light in case where the monitoring unit determines based on the monitored optical level that the wavelength-division multiplexed light is in a condition of input interruption; and a multiplexer configured to multiplex the light of the wavelength modulated based on the transmission data and the dummy light emitted by the dummy light source, wherein the transmitter transmits wavelength-division multiplexed light generated by the multiplexer. Therefore, even in case of failure in a transmission line-amplification of noise components is avoided, the output of the optical amplifier of the transmitter is stabilized, and a quality of transmission is kept in higher.

DESCRIPTION OF EMBODIMENTS

Embodiments of the invention are described below in detail with reference to the drawings.

It is to be noted that description is made on an assumption that light of a wavelength to be passed through by the wavelength-division multiplexing transmission device and light of a wavelength obtained through modulation of input transmission data are both wavelength-division multiplexed light in which light of a plurality of different wavelengths are multiplexed.

(Embodiment 1.)

Description is made of a pass-through function of a wavelength-division multiplexing transmission device.

Figure 1:
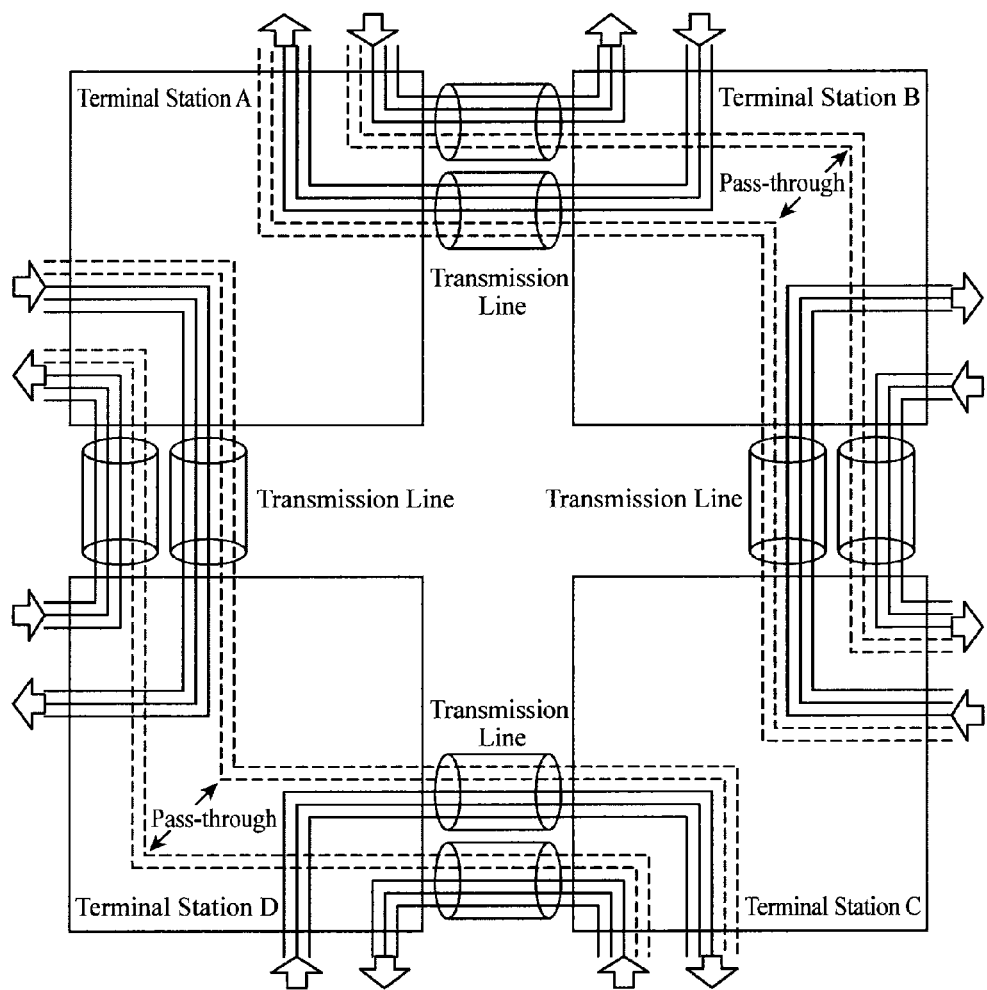
FIG. 1 is an explanatory diagram of a pass-through function of a wavelength-division multiplexing transmission device according to Embodiment 1 of the present invention.

FIG. 1 is an explanatory diagram of a pass-through function of a wavelength-division multiplexing transmission device according to Embodiment 1 of the present invention. FIG. 1 depicts a wavelength-division multiplexing system in which four wavelength-division multiplexing transmission devices (i.e. terminal stations A to D) are provided, and each of the wavelength-division multiplexing transmission devices is connected through two transmission lines (for transmission and reception), so as to configure a ring network.

As indicated by solid lines in FIG. 1, each of the wavelength-division multiplexing transmission devices transmits wavelength-division multiplexed light between adjacent wavelength-division multiplexing transmission devices (e.g. between terminal stations A and B) through the transmission lines.

Meanwhile, as indicated by dashed lines of FIG. 1, direct transmission of wavelength-division multiplexed light is desired, for example, between the terminal stations A and C in some cases. In case of transmitting wavelength-division multiplexed light from the terminal station A to the terminal station C through the terminal station B, the wavelength-division multiplexed light from the terminal station A is passed through by the terminal station B to be transferred toward the terminal station C. In case of transmitting wavelength-division multiplexed light from the terminal station C to the terminal station A through the terminal station B, the wavelength-division multiplexed light from the terminal station C is passed through by the terminal station B to be transferred toward the terminal station A. Likewise, in case of going through the terminal station D, wavelength-division multiplexed light is passed through by the terminal station D.

As described above, wavelength-division multiplexed light to be input to a certain station, which does not terminate at this station, is passed through to a next station.

Description is given of a configuration of the wavelength-division multiplexing transmission device having the pass-through function as described above.

Figure 2:
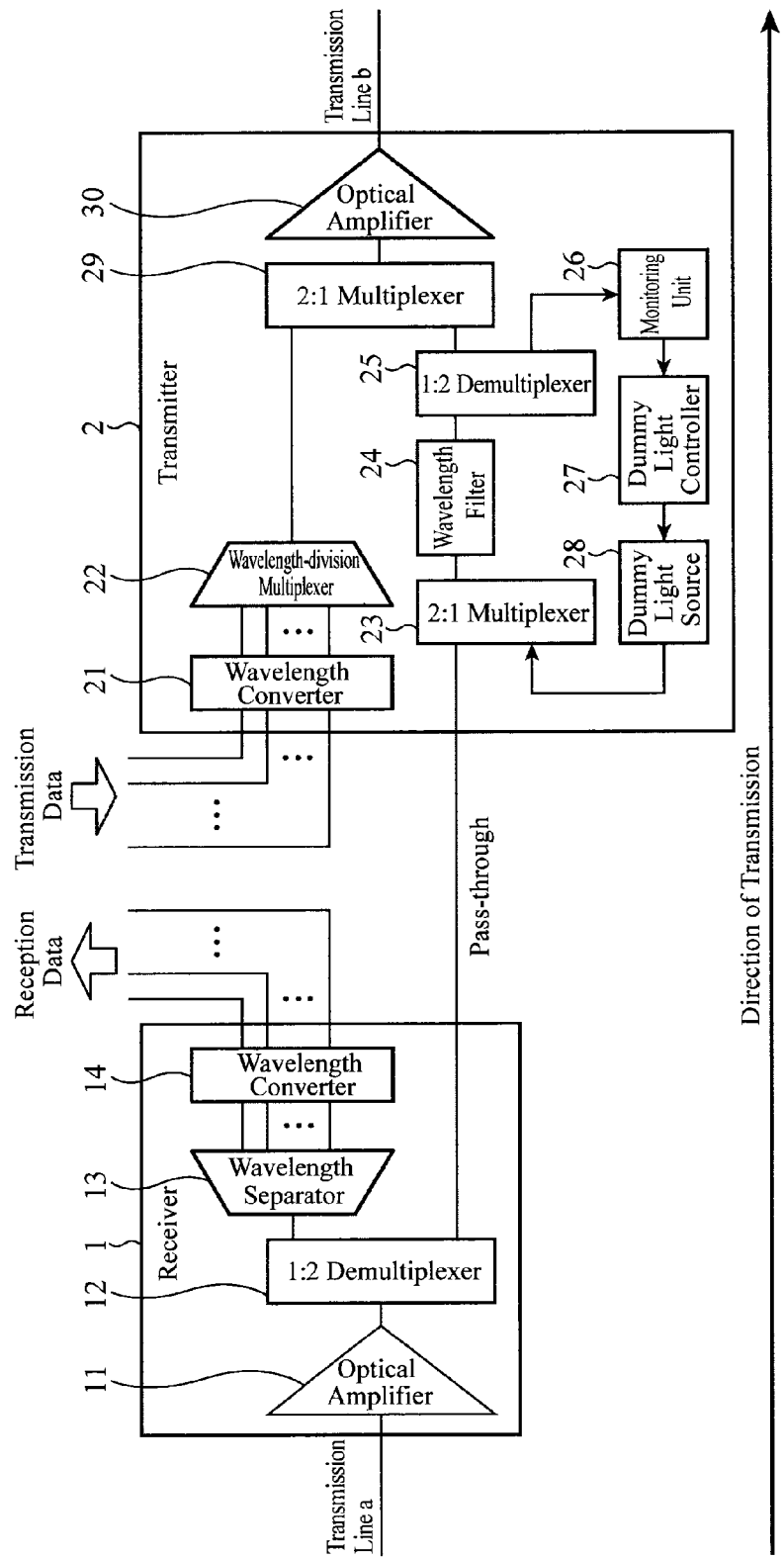
FIG. 2 depicts a configuration of the wavelength-division multiplexing transmission device according to Embodiment 1 of the present invention.

FIG. 2 depicts a configuration of a wavelength-division multiplexing transmission device according to Embodiment 1 of the present invention. In this FIG. 2, a case is described in which wavelength-division multiplexed light is transmitted from a transmission line-a toward a transmission line-b.

As depicted in FIG. 2, the wavelength-division multiplexing transmission device includes a receiver 1 and a transmitter 2.

The receiver 1 separates, per wavelength, the wavelength-division multiplexed light input from the transmission line-a, and demodulate them to generate original signals. The receiver 1 includes an optical amplifier 11, a 1:2 demultiplexer 12, a wavelength separator 13, and a wavelength converter 14.

The optical amplifier 11 is adapted to amplify the wavelength-division multiplexed light input from the transmission line-a, and fulfills a function of supplementing transmission line loss. The wavelength-division multiplexed light amplified by this optical amplifier 11 is output to the 1:2 demultiplexer 12.

The 1:2 demultiplexer 12 is adapted to demultiplex the wavelength-division multiplexed light amplified by the optical amplifier 11 into two parts of light. While one of the two parts of light is output to the wavelength separator 13, another one of the two parts of light is output (i.e. passed through) to the transmitter 2.

The wavelength separator 13 is adapted to separate the wavelength-division multiplexed light input through the 1:2 demultiplexer 12 into light of wavelengths per wavelength. The light of the wavelengths separated by this wavelength separator 13 are output to the wavelength converter 14.

The wavelength converter 14 is adapted to demodulate each of the light of the wavelengths separated by the wavelength separator 13 to generate original signals. The signals generated by the wavelength converter 14 are output to a signal receiver (not shown) as reception data.

The transmitter 2 modulates a plurality of signals to light of different wavelengths, performs wavelength-division multiplexing on the modulated signals, and transmits the multiplexed signal to the transmission line-b. The transmitter 2 includes a wavelength converter 21, a wavelength-division multiplexer 22, a 2:1 multiplexer 23, a wavelength filter 24, a 1:2 demultiplexer 25, a monitoring unit 26, a dummy light controller 27, a dummy light source 28, a 2:1 multiplexer 29, and an optical amplifier 30.

The wavelength converter 21 is adapted to modulate per signal the transmission data input from a signal transmitter (not shown) to generate light of wavelengths. The light of the wavelengths modulated by the wavelength converter 21 are output to the wavelength-division multiplexer 22.

The wavelength-division multiplexer 22 is adapted to perform wavelength-division multiplexing on the light of a plurality of wavelengths modulated by the wavelength converter 21. The wavelength-division multiplexed light on which wavelength-division multiplexing has been performed by the wavelength-division multiplexer 22 is output to the 2:1 multiplexer 29.

The 2:1 multiplexer 23 is adapted to multiplex the wavelength-division multiplexed light that has been passed through by the receiver 1 and dummy light emitted from the dummy light source 28. The wavelength-division multiplexed light multiplexed by the 2:1 multiplexer 23 is output to the wavelength filter 24.

The wavelength filter 24 is adapted to block a part of the wavelength-division multiplexed light to be terminated at the station, which has been input through the 2:1 multiplexer 23. The wavelength filter 24 is also adapted to pass other part of the wavelength-division multiplexed light through the wavelength filter 24 itself, where the passed light is not be terminated at the station. The wavelength-division multiplexed light passed through by the wavelength filter 24 is output to the 1:2 demultiplexer 25.

The 1:2 demultiplexer 25 is adapted to demultiplex the wavelength-division multiplexed light output from the wavelength filter 24 into two parts of light. A first light of the wavelength-division multiplexed light that has been demultiplexed by the 1:2 demultiplexer 25 is output to the 2:1 multiplexer 29, and a second light of the wavelength-division multiplexed light is output to the monitoring unit 26.

The monitoring unit 26 is adapted to monitor an optical level of the wavelength-division multiplexed light input through the 1:2 demultiplexer 25 to evaluate a condition of input of the wavelength-division multiplexed light. When the monitored optical level agrees to a preset expected value, the monitoring unit 26 determines that the wavelength-division multiplexed light is being input normally. In contrast, when the monitored optical level is less than the expected value, the monitoring unit 26 determines that the wavelength-division multiplexed light is not being input normally (i.e. in a condition of input interruption). The result made by the monitoring unit 26 on the input condition of the wavelength-division multiplexed light is supplied to the dummy light controller 27.

Furthermore, when the monitored optical level becomes higher than the expected value after the determination that the wavelength-division multiplexed light is in a condition of input interruption, the monitoring unit 26 determines that the input of the wavelength-division multiplexed light is restored from an interrupted condition to a normal condition, and then informs the dummy light controller 27 of a result of this determination.

The dummy light controller 27 controls the dummy light source 28 so as not to emit dummy light in case where the result informed by the monitoring unit 26 indicates normal (i.e. the wavelength-division multiplexed light is being input normally). In case where the informed result indicates failure (i.e., the wavelength-division multiplexed light is in a condition of input interruption), the dummy light controller 27 controls the dummy light source 28 to emit dummy light.

Furthermore, the dummy light controller 27 controls the dummy light source 28 to stop to emit the dummy light in case where information of restoration to normality on the wavelength-division multiplexed light is informed by the monitoring unit 26.

Figure 3:
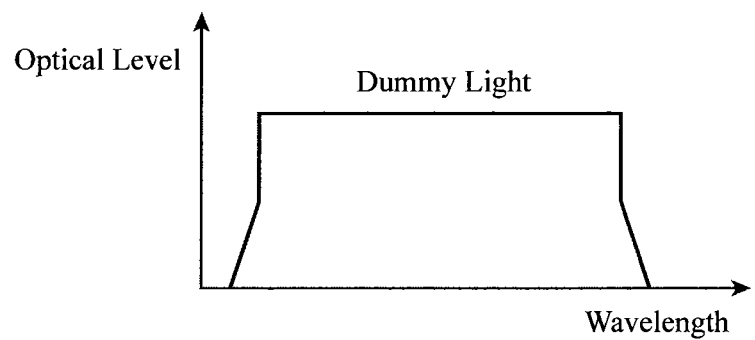
FIG. 3 depicts dummy light output from a dummy light source in Embodiment 1 of the present invention.

The dummy light source 28 is adapted to emit or quench dummy light under the control by the dummy light controller 27. The dummy light source 28 is configured by a light source which can fully cover the wavelengths used in the wavelength-division multiplexing transmission device (e.g. an ASE (Amplified Spontaneous Emission) light source), as depicted in FIG. 3. In order to acquire an output of the wavelength filter 24 which is approximately equal to that in a normal condition, the optical level of dummy light from the dummy light source 28 is preset to become a value approximately equal to an optical level of the wavelength-division multiplexed light passed through by the receiver 1.

The dummy light emitted from the dummy light source 28 is output to the 2:1 multiplexer 23.

The 2:1 multiplexer 29 is adapted to multiplex the wavelength-division multiplexed light on which wavelength-division multiplexing is performed by the wavelength-division multiplexer 22 and the wavelength-division multiplexed light that has been input through the 1:2 demultiplexer 25 from the wavelength filter 24. The wavelength-division multiplexed light multiplexed by the 2:1 multiplexer 29 is output to the optical amplifier 30.

The optical amplifier 30 is adapted to amplify the wavelength-division multiplexed light multiplexed by the 2:1 multiplexer 29. The wavelength-division multiplexed light amplified by the optical amplifier 30 is sent into the transmission line-b.

Next, description is made of an operation of the wavelength-division multiplexing transmission device thus configured. An operation of the receiver 1 is described first.

Figure 4:
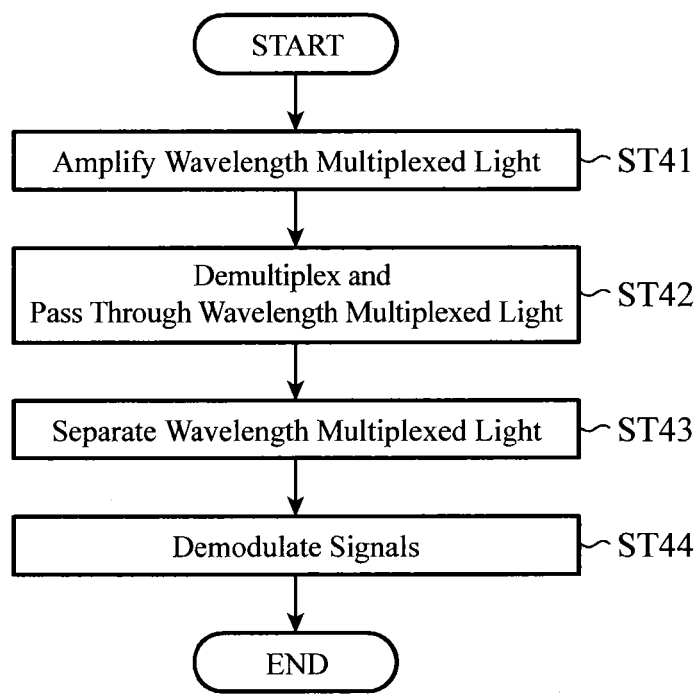
FIG. 4 is a flowchart describing an operation of a receiver in Embodiment 1 of the present invention.

FIG. 4 is a flowchart describing an operation of the receiver 1 in Embodiment 1 of the present invention.

Figure 5:
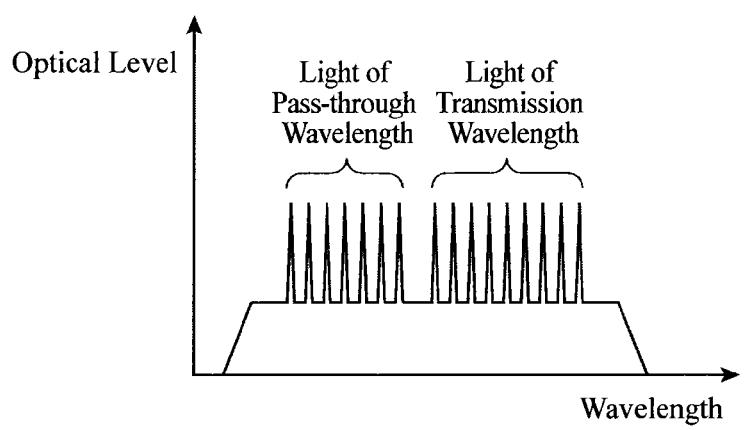
FIG. 5 depicts wavelength-division multiplexed light (light of a transmission wavelength and light of a pass-through wavelength) input from a transmission line in Embodiment 1 of the present invention.

As depicted in FIG. 4, in the operation of the receiver 1, the optical amplifier 11 amplifies the wavelength-division multiplexed light input from the transmission line-a (step ST41). As depicted in FIG. 5, the wavelength-division multiplexed light input from the transmission line-a is comprised by light of a transmission wavelength which terminates at the station and light of a pass-through wavelength which does not terminate at the station (i.e. light to be passed through to a next station). The wavelength-division multiplexed light amplified by the optical amplifier 11 is output to the 1:2 demultiplexer 12.

The 1:2 demultiplexer 12 demultiplexes the wavelength-division multiplexed light amplified by the optical amplifier 11 into two parts of light (step ST42). One of the two parts of light demultiplexed by the 1:2 demultiplexer 12 is output to the wavelength separator 13, and another one is output (i.e. passed through) to the transmitter 2.

The wavelength separator 13 separates the wavelength-division multiplexed light from the 1:2 demultiplexer 12 into light of wavelengths per wavelength (step ST43). The light of the wavelengths separated by the wavelength separator 13 are output to the wavelength converter 14.

The wavelength converter 14 demodulates the light of the wavelengths separated by the wavelength separator 13 to generate original signals (step ST44). Those signals are output to a signal receiver as reception data.

Meanwhile, an operation of the transmitter 2 is described. Description is given first of an operation of the transmitter 2 for sending wavelength-division multiplexed light.

Figure 6:
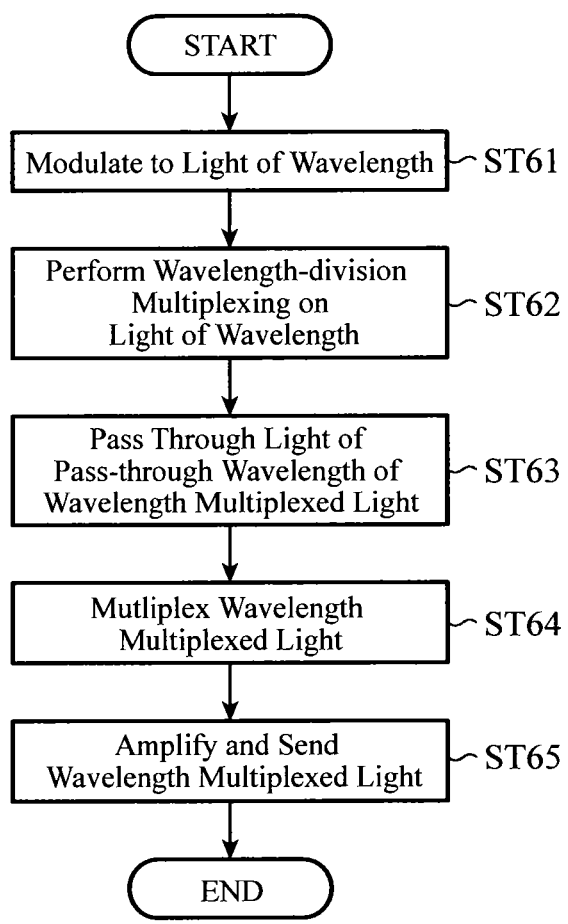
FIG. 6 is a flowchart describing an operation of a transmitter for sending wavelength-division multiplexed light in Embodiment 1 of the present invention.

FIG. 6 is a flowchart describing the operation of the transmitter 2 for sending wavelength-division multiplexed light in Embodiment 1 of the present invention.

As depicted in FIG. 6, in a sending operation of the wavelength-division multiplexed light at the transmitter 2, the wavelength converter 21 modulates per signal the transmission data input from a signal transmitter to generate light of wavelengths (step ST61). The light of the wavelengths modulated by the wavelength converter 21 are output to the wavelength-division multiplexer 22.

Figure 7:
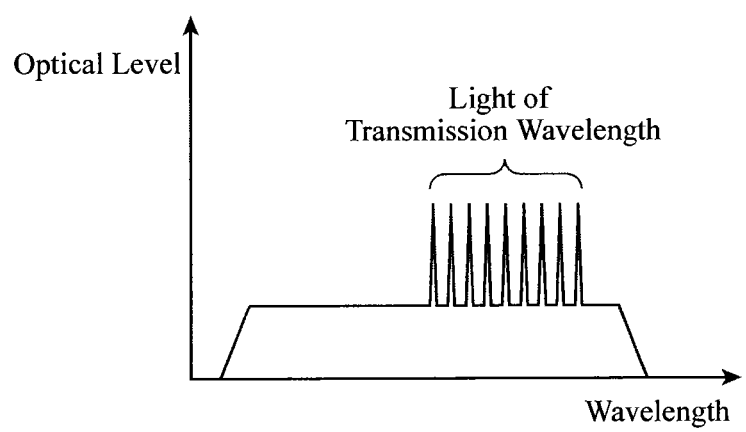
FIG. 7 depicts wavelength-division multiplexed light (light of a transmission wavelength) output from a wavelength-division multiplexer in Embodiment 1 of the present invention.

The wavelength-division multiplexer 22 performs wavelength-division multiplexing on the light of the wavelengths modulated by the wavelength converter 21 (step ST62). The wavelength-division multiplexed light generated by the wavelength-division multiplexer 22 comprises light of a transmission wavelength as depicted in FIG. 7. The wavelength-division multiplexed light generated by the wavelength-division multiplexer 22 is output to the 2:1 multiplexer 29.

Figure 8:
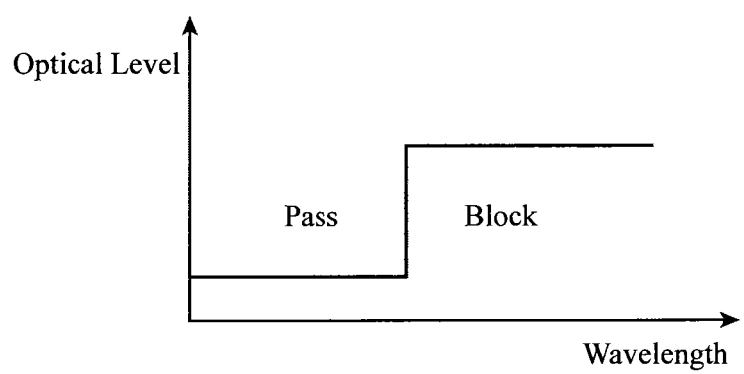
FIG. 8 depicts a characteristic of a wavelength filter in Embodiment 1 of the present invention.
Figure 9:
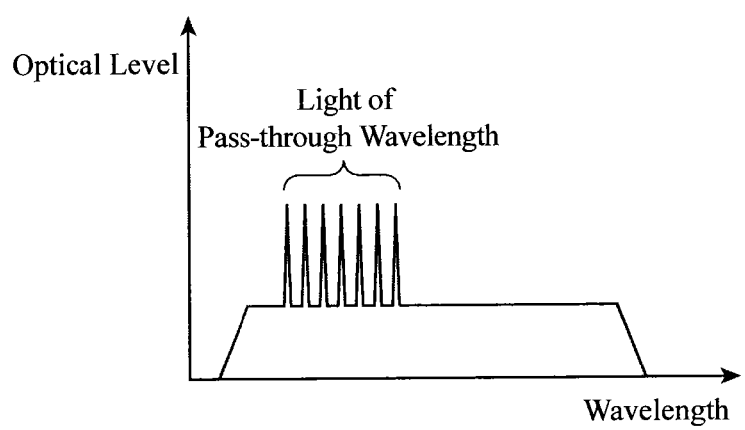
FIG. 9 depicts wavelength-division multiplexed light (light of a pass-through wavelength) output from the wavelength filter in Embodiment 1 of the present invention.

The wavelength filter 24 blocks a part of the wavelength-division multiplexed light passed through by the receiver 1 via the 2:1 multiplexer 23. The blocked light has a wavelength to be terminated at the station. On the other hand, other part of the wavelength-division multiplexed light passed through by the receiver 1 is passed through by the wavelength filter 24 (step ST63). The passed through light has a wavelength which is not terminated at the station. The wavelength filter 24 has a characteristic of filter as depicted in FIG. 8, and passes the wavelength-division multiplexed light having a pass-through wavelength, as depicted in FIG. 9. The wavelength-division multiplexed light passed through and output by the wavelength filter 24 is output toward the 2:1 multiplexer 29 via the 1:2 demultiplexer 25.

The 2:1 multiplexer 29 multiplexes the wavelength-division multiplexed light from the wavelength-division multiplexer 22 and the wavelength-division multiplexed light from the wavelength filter 24 via the 1:2 demultiplexer 25 (step ST64). As depicted in FIG. 5, the wavelength-division multiplexed light multiplexed by the 2:1 multiplexer 29 comprises light of a transmission wavelength and light of a pass-through wavelength. The wavelength-division multiplexed light multiplexed by the 2:1 multiplexer 29 is output to the optical amplifier 30. The optical amplifier 30 amplifies the wavelength-division multiplexed light from the 2:1 multiplexer 29 (step ST65). The amplified light is transmitted to the transmission line-b.

Next, description is given of an operation of the transmitter 2 for monitoring the condition of input of wavelength-division multiplexed light.

Figure 10:
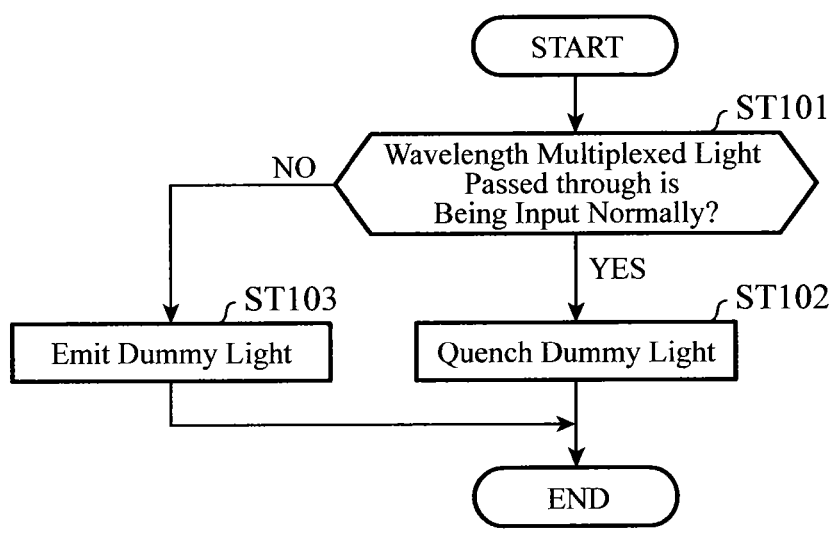
FIG. 10 is a flowchart describing an operation of the transmitter for evaluating the input condition of wavelength-division multiplexed light in Embodiment 1 of the present invention.

FIG. 10 is a flowchart describing the operation of the transmitter 2 for evaluating the condition of input of wavelength-division multiplexed light in Embodiment 1 of the present invention.

In the evaluating operation on the input condition of wavelength-division multiplexed light by the transmitter 2, as described in FIG. 10, the monitoring unit 26 monitors wavelength-division multiplexed light input from the wavelength filter 24 via the 1:2 demultiplexer 25, and determines whether the wavelength-division multiplexed light is being input normally (step ST101). Specifically, in case where the optical level being monitored agrees to a preset expected value, the monitoring unit 26 determines that the wavelength-division multiplexed light is being input normally. In case where the optical level is less than the expected value, the monitoring unit 26 determines that the wavelength-division multiplexed light is not being input normally.

In step ST101, when the monitoring unit 26 determines that the wavelength-division multiplexed light is being input normally, the dummy light controller 27 controls the dummy light source 28 so as not to emit dummy light (step ST102).

Figure 11:
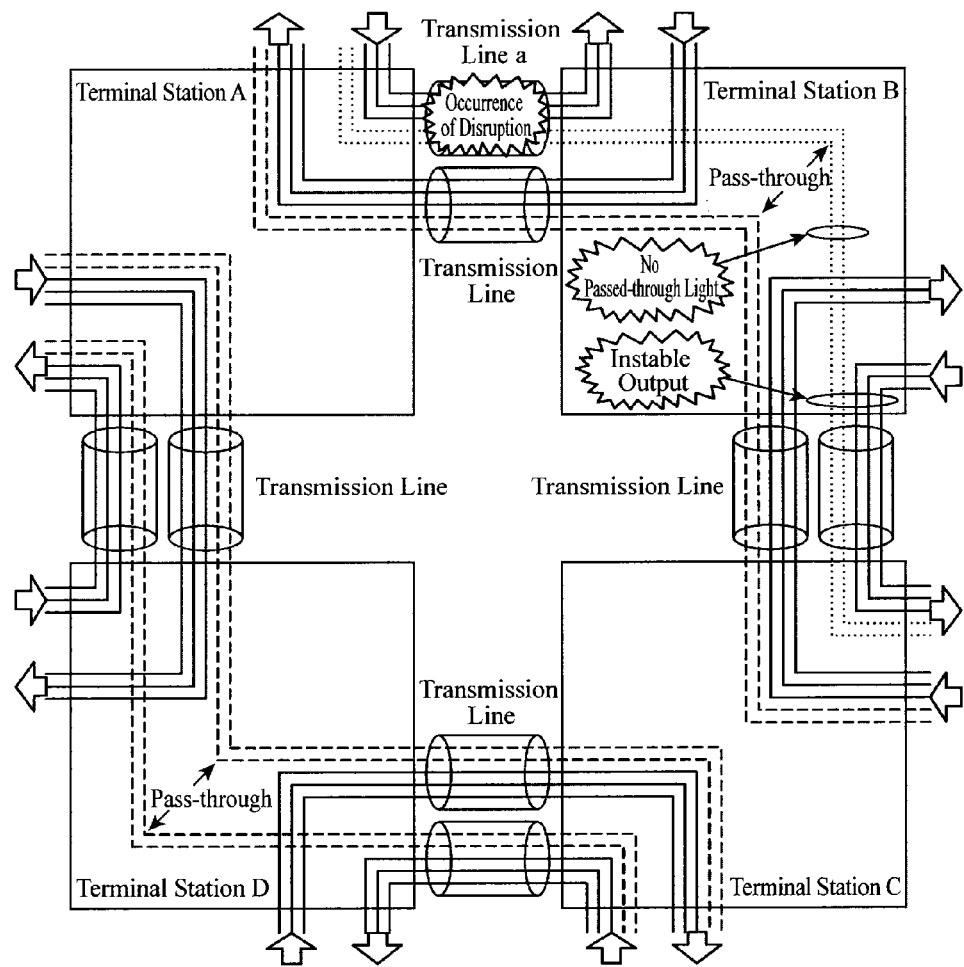
FIG. 11 is an explanatory diagram of occurrence of disruption in a transmission line in the wavelength-division multiplexing transmission device according to Embodiment 1 of the present invention.

Meanwhile, in step ST101, when the monitoring unit 26 determines that wavelength-division multiplexed light is not being input normally (i.e. in a condition of input interruption), the dummy light controller 27 controls the dummy light source 28 to emit dummy light (step ST103). As indicated by dashed lines in FIG. 11 (which depicts a case of transmitting wavelength-division multiplexed light from the terminal station A to the terminal station C), it is assumed that a trouble such as disruption occurs in the transmission line-a, and interruption of input takes place on wavelength-division multiplexed light to the receiver 1 of the terminal station B. In this situation, since wavelength-division multiplexed light to be passed through by the terminal station B does not exist, the output of the optical amplifier 30 in the terminal station B becomes lower than the normal value, and then becomes unstable.

Figure 12:
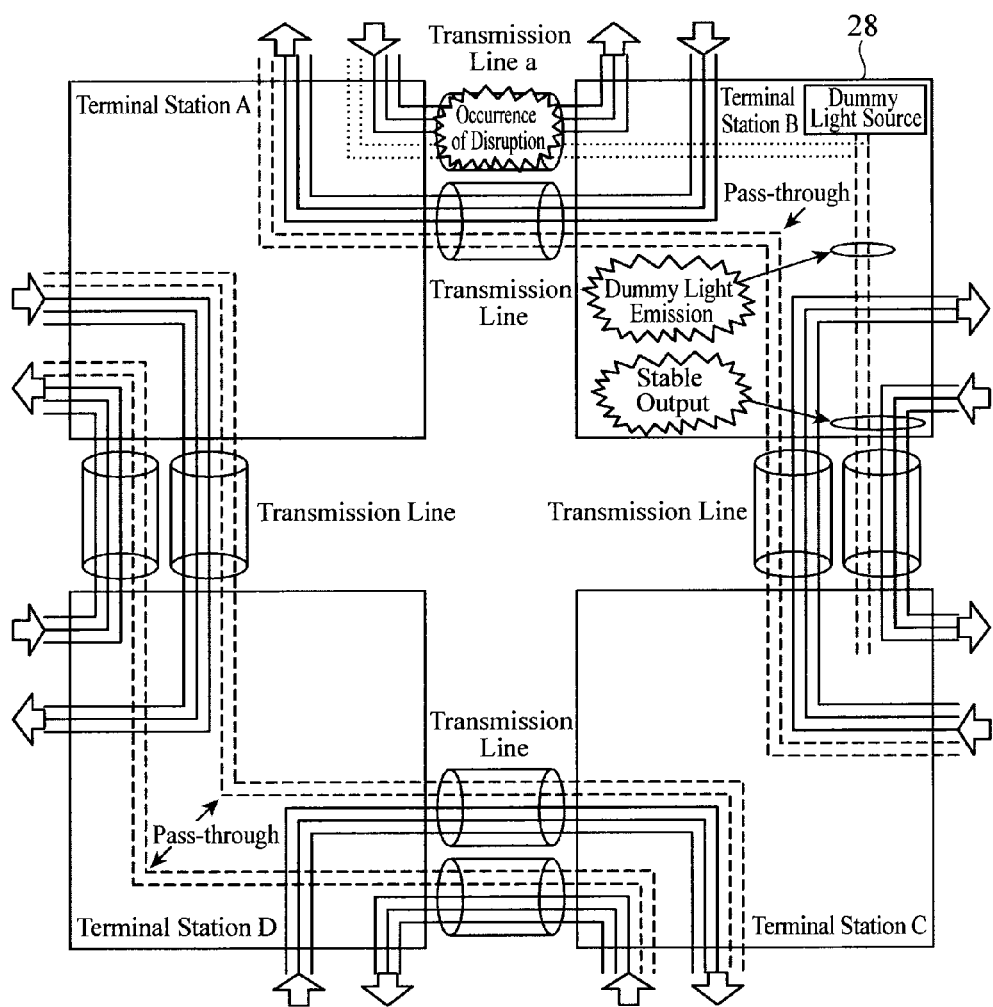
FIG. 12 is an explanatory diagram of an operation for stabilizing optical output in the wavelength-division multiplexing transmission device according to Embodiment 1 of the present invention.
Figure 13:
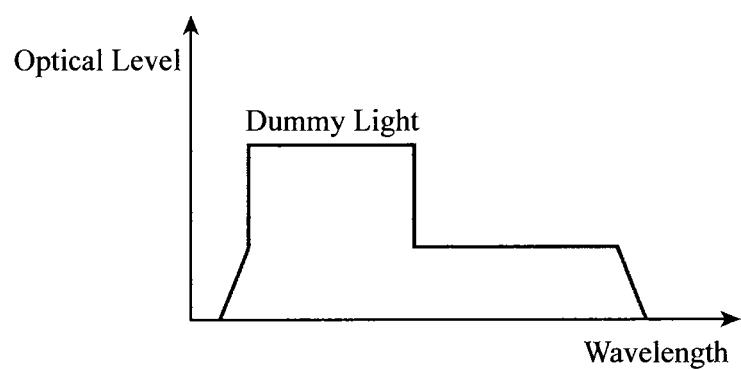
FIG. 13 depicts dummy light output from the wavelength filter in Embodiment 1 of the present invention.
Figure 14:
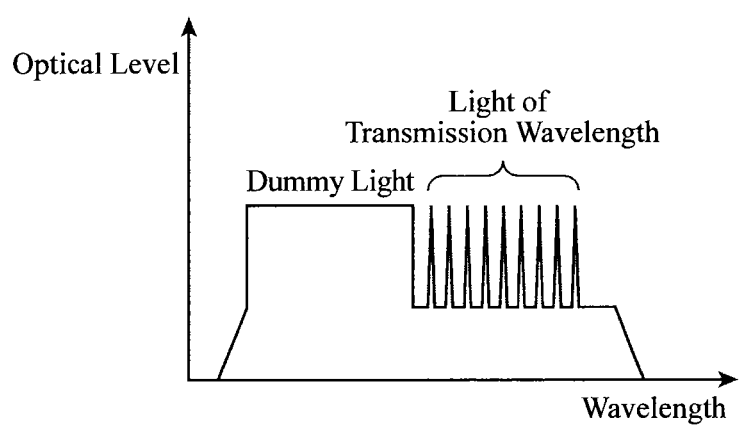
FIG. 14 depicts wavelength-division multiplexed light (light of a transmission wavelength and dummy light) output from a 2:1 multiplexer in Embodiment 1 of the present invention.

However, in step ST103, by controlling the dummy light source 28 of the terminal station B to emit dummy light as depicted in FIG. 12, dummy light as depicted in FIG. 3 is output from the 2:1 multiplexer 23. As depicted in FIG. 13, the dummy light output from the 2:1 multiplexer 23 through the wavelength filter 24 is transformed as dummy light having wavelength components which do not terminate at the station. The dummy light through the 1:2 demultiplexer 25 is multiplexed with the wavelength-division multiplexed light from the wavelength-division multiplexer 22 by the 2:1 multiplexer 29. The multiplexed light indicates a characteristic of wavelength-division multiplexed light as depicted in FIG. 14. Accordingly, even if interruption of input takes place on wavelength-division multiplexed light to be passed through by the station, output of the optical amplifier 30 of this station indicates a value approximately equal to the normal value with stability by compensating the interrupted input with dummy light.

Since the dummy light does not contain signal components, a failure is detected at a later station (i.e. the terminal station C) on which a termination occurs.

After emission of dummy light from the dummy light source 28, the optical level being monitored by the monitoring unit 26 agrees to the expected value. However, this is achieved by emission of dummy light and not by solution of the failure in the transmission line-a and restoration to a normal condition from the condition of input interruption of the wavelength-division multiplexed light. Therefore, the dummy light controller 27 controls the dummy light source 28 to continue emission of dummy light.

Thereafter, when the failure in the transmission line-a is resolved and a normal condition is restored from the condition of input interruption of the wavelength-division multiplexed light, the 2:1 multiplexer 23 multiplexes the dummy light and the wavelength-division multiplexed light passed through by receiver 1. Since the optical level monitored by the monitoring unit 26 becomes higher than the expected value, the monitoring unit 26 recognizes that the normal condition of the wavelength-division multiplexed light is restored. This recognition of the monitoring unit 26 is informed to the dummy light controller 27. The dummy light controller 27 controls the dummy light source 28 to stop to emit dummy light.

As described above, according to Embodiment 1, the transmitter 2 is configured such that the optical level of the wavelength-division multiplexed light output from the wavelength filter 24 is monitored without performing regulation of the amplification rate of the optical amplifier 30, and dummy light is emitted when determining that wavelength-division multiplexed light is in a condition of input interruption. Therefore, even if failure occurs in the transmission line-a, noise components are not amplified, and the output of the optical amplifier 30 is stabilized, which allows for maintenance of higher transmission quality.

(Embodiment 2.)

Figure 15:
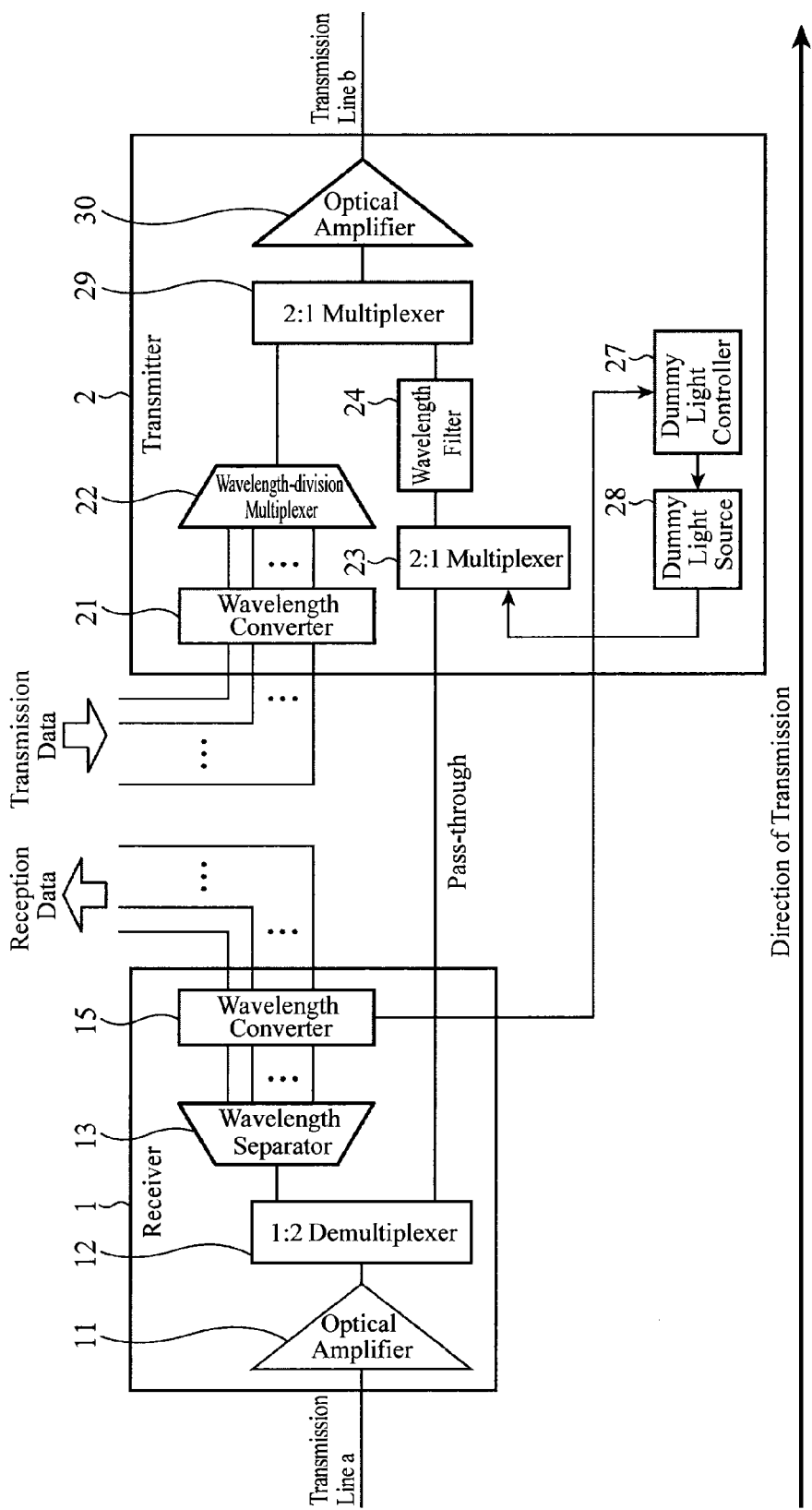
FIG. 15 depicts a configuration of a wavelength-division multiplexing transmission device according to Embodiment 2 of the present invention.

FIG. 15 depicts a configuration of a wavelength-division multiplexing transmission device according to Embodiment 2 of the present invention. A wavelength-division multiplexing transmission device according to Embodiment 2 depicted in FIG. 15 is the wavelength-division multiplexing transmission device according to Embodiment 1 depicted in FIG. 2 in which the 1:2 demultiplexer 25 and the monitoring unit 26 are removed from the transmitter 2, and the wavelength converter 14 of the receiver 1 is changed as a wavelength converter 15. The other configuration is the same and like reference numerals are assigned to skip redundant description.

Figure 16:
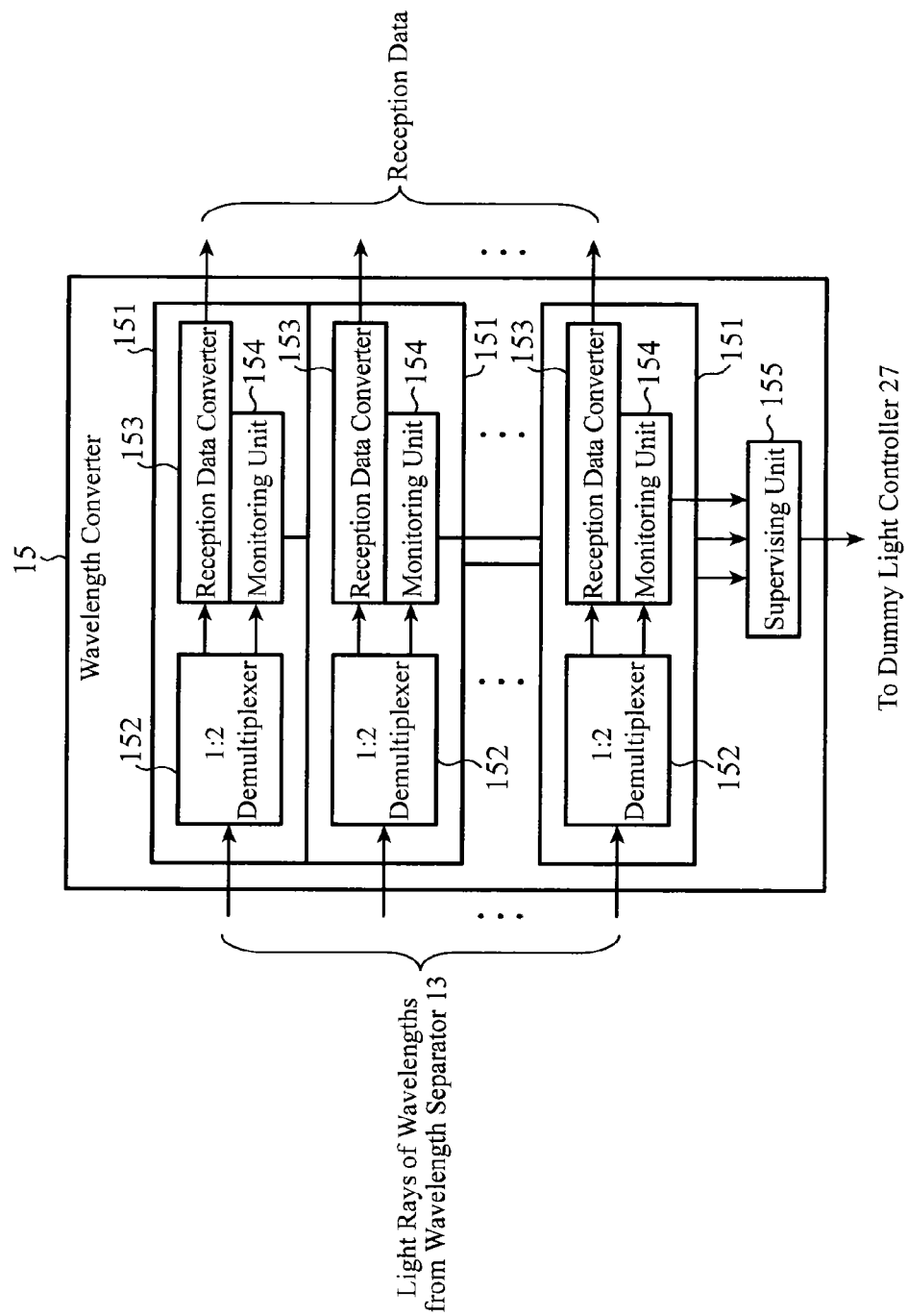
FIG. 16 depicts a configuration of a wavelength converter in Embodiment 2 of the present invention.

FIG. 16 depicts a configuration of the wavelength converter 15 in Embodiment 2.

The wavelength converter 15 is adapted to modulate light of wavelengths separated by the wavelength separator 13 to generate original signals. As depicted in FIG. 16, the wavelength converter 15 has subblocks 151 according to the number of wavelengths, each of which demodulates light of a specific wavelength to generate the original signal. Each of the subblocks 151 includes a 1:2 demultiplexer 152, a reception data converter 153, and a monitoring unit 154. The wavelength converter 15 has a supervising unit 155.

The 1:2 demultiplexer 152 is adapted to demultiplex light of a wavelength separated by the wavelength separator 13 into two parts of light. One of the two parts of light is output to the reception data converter 153, and another one is output to the monitoring unit 154.

The reception data converter 153 is adapted to demodulate the light of the wavelength input from the wavelength separator 13 via the 1:2 demultiplexer 152 to generate original signals. The signals resulting from the demodulation by the reception data converter 153 are output to a signal receiver as reception data.

The monitoring unit 154 is adapted to monitor the optical level of the light of the wavelength input from the wavelength separator 13 via the 1:2 demultiplexer 152, and evaluates the condition of input of the monitored light. The monitoring unit 154 is one that has already been in use from before for evaluating the input condition of light of individual wavelengths.

When the monitored optical level agrees to a preset expected value, the monitoring unit 154 determines that the light of the wavelength is being input normally. On the other hand, when the monitored optical level is less than the expected value, the monitoring unit 154 determines that the light of the wavelength is not being input normally (i.e. in a condition of input interruption). The determination made by the monitoring units 154 on the input conditions of the light of the wavelengths are informed to the supervising unit 155.

In case where the monitored optical level agrees to the expected value after determination that the light of the wavelength is in a condition of input interruption, the monitoring unit 154 determines that the light of the wavelength is restored to a normal condition from the input interruption condition, and then informs the supervising unit 155 of this situation.

The supervising unit 155 is adapted to collect the results of determination on input conditions of the light of the wavelengths from each of the monitoring units 154, and supervises the input conditions of light of the whole wavelengths. The supervising result made by the supervising unit 155 on input conditions of the light of the whole wavelengths is output to the dummy light controller 27.

In case where determination is made that the light of the entire wavelengths are restored from the input interruption condition to a normal condition, the supervising unit 155 informs the dummy light controller 27 of this situation.

In case where the result indicates normality (i.e. the light of the wavelengths are being input normally), the dummy light controller 27 controls the dummy light source 28 so as not to emit dummy light in accordance with the information on the result of input condition from the supervising unit 155. Meanwhile, in case where the result indicates failure (i.e. the light of the entire wavelengths are in a condition of input interruption), the dummy light source 28 is controlled to emit dummy light.

Furthermore, upon receipt of information of restoration to normality of the light of the wavelengths from the supervising unit 155, the dummy light controller 27 controls the dummy light source 28 to stop emission of dummy light.

As described above, according to Embodiment 2, the condition of input of the wavelength-division multiplexed light that has been demultiplexed and passed through by the 1:2 demultiplexer 12 is evaluated by using an interruption detecting function of the monitoring units 154 that have already been in use from before to monitor the light of wavelengths demultiplexed by the 1:2 demultiplexer 12 and separated by the wavelength separator 13. Accordingly, as compared with Embodiment 1, the 1:2 demultiplexer 25 and the monitoring unit 26 may be eliminated, and reduction is achieved with respect to the number of components (i.e. an additional component are not needed).

In each of Embodiments 1 and 2, description has been made such that the light of a wavelength to be passed through and the light of a wavelength resulting from modulation of transmission data are both wavelength-division multiplexed light in which light of a plurality of different wavelengths are multiplexed, however, light of a single wavelength may be adopted as the light of a wavelength to be passed through and the light of a wavelength resulting from modulation of transmission data.

INDUSTRIAL APPLICABILITY

As described above, the wavelength-division multiplexing transmission device according to the invention is configured to stabilize output of the optical amplifier of the transmitter without causing amplification of noise components even in case of occurrence of failure in a transmission line and also to maintain higher transmission quality. Therefore, this invention is suitable to devices including a wavelength-division multiplexing transmission device having the pass-through function for stabilizing output light even in case of interruption in input of wavelength-division multiplexed light.

REFERENCE SIGNS LIST 1 receiver
2 transmitter
11 optical amplifier
12 1:2 demultiplexer
13 wavelength separator
14 wavelength converter
15 wavelength converter
21 wavelength converter
22 wavelength-division multiplexer
23 2:1 multiplexer
24 wavelength filter
25 1:2 demultiplexer
26 monitoring unit
27 dummy light controller
28 dummy light source
29 2:1 multiplexer
30 optical amplifier
151 subblock
152 1:2 demultiplexer
153 reception data converter
154 monitoring unit
155 supervising unit

The invention claimed is:

1. A wavelength-division multiplexing transmission device including a receiver and a transmitter, the receiver being configured to demultiplex wavelength-division multiplexed light received by said device and configured to demodulate one of the demultiplexed light to output reception data while passing another one of the demultiplexed light through said receiver, the transmitter being configured to transmit wavelength-division multiplexed light generated by multiplexing light of wavelengths which have been modulated based on transmission data and light of a wavelength passed through by the receiver, the wavelength-division multiplexing transmission device comprising:
   a dummy light source configured to emit and quench dummy light;
   a monitoring unit configured to monitor an optical level relating to the received wavelength-division multiplexed light;
   a dummy light controller configured to control the dummy light source to emit dummy light in case where the monitoring unit determines based on the monitored optical level that the wavelength-division multiplexed light is in a condition of input interruption; and
   a multiplexer configured to multiplex the light of the wavelength modulated based on the transmission data and the dummy light emitted by the dummy light source, wherein
   the transmitter transmits wavelength-division multiplexed light generated by the multiplexer.

2. The wavelength-division multiplexing transmission device according to claim 1, wherein the optical level relating to the wavelength-division multiplexed light monitored by the monitoring unit is an optical level of the light of the wavelength which has been demultiplexed from the wavelength-division multiplexed light and has been passed through by the receiver.

3. The wavelength-division multiplexing transmission device according to claim 1, wherein the optical level relating to the wavelength-division multiplexed light monitored by the monitoring unit is an optical level of light of the wavelength which has been demultiplexed from the wavelength-division multiplexed light and to be demodulated.

4. The wavelength-division multiplexing transmission device according to claim 1, wherein the dummy light emitted by the dummy light source is set to have an optical level equivalent to that of the light of the wavelength passed through by the receiver.

* * * * *